US008625794B2

(12) United States Patent
Michiels

(10) Patent No.: US 8,625,794 B2
(45) Date of Patent: Jan. 7, 2014

(54) WHITE-BOX CRYPTOGRAPHIC SYSTEM WITH CONFIGURABLE KEY USING INTERMEDIATE DATA MODIFICATION

(75) Inventor: Wilhelmus Petrus Adrianus Johannus Michiels, Hoofddorp (NL)

(73) Assignee: Irdeto Corporate B.V., Hoofddorp (NL)

( * ) Notice: Subject to any disclaimer, the term of this patent is extended or adjusted under 35 U.S.C. 154(b) by 16 days.

(21) Appl. No.: 13/378,891

(22) PCT Filed: Jun. 17, 2010

(86) PCT No.: PCT/EP2010/058590
§ 371 (c)(1),
(2), (4) Date: Dec. 16, 2011

(87) PCT Pub. No.: WO2010/146139
PCT Pub. Date: Dec. 23, 2010

(65) Prior Publication Data
US 2012/0093313 A1    Apr. 19, 2012

(30) Foreign Application Priority Data
Jun. 19, 2009  (EP) .................................... 09163250

(51) Int. Cl.
*H04K 1/00*    (2006.01)
(52) U.S. Cl.
USPC ........................................................ 380/255
(58) Field of Classification Search
USPC ........................................................ 380/255
See application file for complete search history.

(56) References Cited

U.S. PATENT DOCUMENTS

2004/0071291 A1*  4/2004  Romain et al. ................. 380/43
2006/0140401 A1   6/2006  Johnson
2010/0303231 A1* 12/2010  Gorissen et al. ............. 380/210

FOREIGN PATENT DOCUMENTS

FR         2820577 A1    8/2002
WO   20080142612 A2   11/2008

OTHER PUBLICATIONS

Chow et al: "White-Box Cryptography and an AES Implementation" Selected Areas in Cryptography: 9th Annual International Workshop; Revised Papers/SAC 2002, St John's, Newfoundland, Canada, Aug. 15, 2002; Aug. 15-16, 2002 Springer Verlag, Berlin (DE), vol. 2595, pp. 25-270, XP002521155 ISBN: 978-3-540-00622-0.
Chow et al: "A White-Box Des Implementation for DRM Applications", Pre-proceedings for CM DRM-2002 workshop, Version: Oct. 15, 2002, 16 pages.

* cited by examiner

*Primary Examiner* — Kambiz Zand
*Assistant Examiner* — Abiy Getachew

(57) ABSTRACT

A white-box cryptographic system (600) is presented for performing a key-dependent cryptographic operation, such as AES. The system comprises a network of a plurality of look-up tables (640) arranged for collectively performing the cryptographic operation, the network being adapted for a particular cryptographic key. By sending a key substitute (664) which represents to the network a further cryptographic key a key translation unit can arrange the effect of the network on the cryptographic operation such that is adapted for a further cryptographic key. In this way the system can be updated to use the further key instead of the particular key.

20 Claims, 12 Drawing Sheets

WHITE-BOX CRYPTOGRAPHIC SYSTEM WITH CONFIGURABLE KEY USING INTERMEDIATE DATA MODIFICATION

FIELD OF THE INVENTION

The invention relates to a white-box cryptographic system for performing a keyed cryptographic operation mapping an input-message to an output-message, the system comprising a network of a plurality of look-up tables arranged for collectively performing the cryptographic operation, the network being adapted for a particular cryptographic key.

The invention further relates to a cryptographic method for performing a keyed cryptographic operation and corresponding computer program.

BACKGROUND OF THE INVENTION

The Internet provides users with convenient and ubiquitous access to digital content. Because of the potential of the Internet as a powerful distribution channel, many consumer electronics (CE) products strive to directly access the Internet or to interoperate with the PC platform, the predominant portal to the Internet. The CE products include, but are not limited to, digital set top boxes, digital TVs, game consoles, PCs and, increasingly, hand-held devices such as PDAs, mobile phones, and mobile storage and rendering devices, such as Apple's iPod. The use of the Internet as a distribution medium for copyrighted content creates the compelling challenge to secure the interests of the content provider. In particular it is required to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users or devices can be trusted.

Typically, digital rights management systems use an encryption technique based on block ciphers that process the data stream in blocks using a sequence of encryption/decryption steps, referred to as rounds. During each round, a round-specific function is performed. The round-specific function may be based on a same round function that is executed under control of a round-specific sub-key.

Content providers must deliver content to legitimate users across a hostile network to a community where not all users or devices can be trusted. In particular for the PC platform, the user must be assumed to have complete control of the hardware and software that provides access to the content, and an unlimited amount of time and resources to attack and bypass any content protection mechanisms. The software code that enforces the terms and conditions under which the content may be used must not be tampered with. The general approach in digital rights management for protected content distributed to PCs is to encrypt the digital content, for instance DES (Data Encryption Standard), AES (Advanced Encryption Standard), or using the method disclosed in WO9967918, and to use decryption keys.

The two main areas of vulnerability of digital rights management relying on encryption are the software plug-ins which enforce the terms and conditions under which the content may be used, and the key distribution and handling.

After the key used to encrypt content is comprised, it can be distributed over the Internet with comparative ease. One way to avoid this is to use white-box cryptography, wherein a key dependent cryptographic operation is performed in such a way that the key cannot be recovered, not even by attacker having full access to the implementation. In white-box cryptography it is assumed that an attacker has full access to the implementation. Apart from analyzing the input and output behavior of a system, in the white box context an attacker may also analyze the internal behavior of a system. Usually it is the goal of a white box attack to recover in a useable form the key that corresponds to particular encryption or decryption operation.

Most white-box implementations use techniques based on hiding the cryptographic key by adding a veil of randomness, such as random encodings, and complexity in both the control and the data path of the software application. The idea behind this is that it becomes more difficult to extract information merely by code inspection.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2", disclose methods with the intend to hide the key by a combination of encoding its tables with random bijections, and extending the cryptographic boundary by pushing it out further into the containing application.

In Chow's white-box implementations, the key is not explicitly present in the implementation. This reduces the risk of the key being found by inspection of the implementation. Instead, the key is only present implicitly. Chow uses the method of partial evaluation to hide a key in a cryptographic system, therein a look-up table which needs key input is evaluated in-so-far it depends on the key and does not depend on the input-message. For example, a basic operation wherein an input-value, a key-value, and a masking value which does not depend on the input-message, e.g. a value from an s-box needs to be xor-ed can be partially evaluated by xor-ing the key value and the masking value together beforehand. In this way the operation still depends on the key-value although the key-value is not explicitly present in the implementation. Instead, only the xor between the key-value and masking-value is present in the implementation.

SUMMARY OF THE INVENTION

A problem with the approach taken in Chow 1 and Chow 2 is that the key is embedded in the white-box implementation. All operations that depend on the key are simplified to depend on one particular key. In this way that particular key is spread throughout the implementation making hiding through obfuscation of the key easier. Instead of having a key schedule in the implementation, the approach taken in Chow 1 and 2 pre-calculates all round keys. There is therefore no need for a separate key schedule, which is therefore also dispensed with.

A disadvantage of this approach is that the white-box implementation can only be used for one cryptographic key. This is considered a disadvantage for some applications. For example, for security reasons one may want to frequently update the key used. If at some point, for whatever reason the particular key is leaked, then it is only of use to an attacker for a limited amount of time, until the next key-update. Moreover, having the possibility of using multiple keys makes it easier to do key management. For example: First content intended for a first group of people can be encrypted with a first key, and second content intended for a second group of people can be encrypted with a second key. A user who is in the intersection of the first group and the second group may access both the first and the second content using a single white-box system whose key can be reconfigured for both the first key and the second key. Moreover, there exist a number of protocols and cryptographic standards which make it impossible or impractical to fix the used key beforehand. For example, key negotiation protocols cannot be used with cryptographic operations using a fixed key. Also DRM standards, such as OMA DRM, assume that different keys are used for content keys, right keys etc.

One solution to update the key used in white box implementation is to update the entire white box implementation, or at least all of its tables, this may however be impractical as the size of white box implementations is often rather large, especially when compared with the size of a typical key. For example, a white-box implementation may be tens or even hundreds of kilobytes, whereas a single AES key is only 16 bytes. Even an AES key which is expanded into its corresponding round keys is only 160 bytes.

It would be advantageous to have an improved white-box cryptographic system for performing a keyed cryptographic operation mapping an input-message to an output-message. The system comprises a network of a plurality of look-up tables arranged for collectively performing the cryptographic operation, the network being adapted for a particular cryptographic key. Note that the network may also be used with independent round keys, which are not obtained through a key schedule from a single AES key. In this way, the amount of key material on which the operation depends can be greatly increased. For the case of AES, for example, one may have 10 time 128 bit of independent key material instead of 128 bit. The system is configured to receive a key substitute which represents to the network a further cryptographic key. The system comprises at least one key translation unit configured for receiving a first input depending on an intermediate cryptographic result in the network and a second input depending on the key substitute. The system is arranged for mapping the input-message to the output-message via the network and the key translation unit to arrange the effect of the network on the cryptographic operation to being adapted for the further cryptographic key.

The cryptographic system performs the key-dependent cryptographic operation by using look-up tables to map the input message to intermediate processing data and eventually to the output-message. The look-up tables that are used to do the mapping represent the key on which the cryptographic operation depends. The system maps input messages to output messages via the key translation unit. One of the inputs of the key translation unit is an intermediate cryptographic result in the network which is arranged for collectively performing the cryptographic operation. As the mapping is performed via the key translation unit, it has the opportunity to influence the way in which the cryptographic operation is performed. Although the look-up tables in the network need not be changed, the effect that they have on the cryptographic operation can be changed by the key translation unit, by affecting intermediate results in the network. The effect of the network on the cryptographic operation may be arranged such that it is adapted to a further cryptographic key.

A second input of the key translation unit is a key substitute. Since the key substitute represents to the system the further cryptographic key the system can adapt the effect of the network of look-up tables on the cryptographic operation such that it is adapted for the further cryptographic key.

There may be multiple look-up tables that are adapted to a particular key, whose behavior may be changed by one or more key translation units. For example, there may be key translation unit for each look-up table that is specific for a particular key.

As the system can receive a key substitute, the key can be updated from outside the system, and in particular, even after the cryptographic operation has been implemented as a white-box.

As noted, for many cryptographic operations it is desired to have a white-box implementation. The invention may be applied, for example, to symmetric and asymmetric cryptographic operations. Also, the invention may be applied to table ciphers, stream ciphers, message authentication schemes, signature schemes, etc. Note that the invention may also be applied to hash functions. The latter is especially useful if the hash function is used as a building table which processes secret information, e.g., a secret key, secret data, etc. For example, the invention may be applied to a hash function used in a keyed-Hash Message Authentication Code (HMAC or KHMAC). Well known table ciphers include Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any table cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also comprise encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACs. This strengthens the non-repudiation properties of such a message authentication scheme.

The plurality of look-up tables are interconnected, in the sense that some of the outputs obtained from some look-up tables are used as inputs, or as part of inputs, for other look-up tables. A look-up table manager may be used to manage the receiving and forwarding of intermediate result from and to the look-up tables. The look-up tables therefore build on the results of one or more of the previous tables. In this way the look-up tables can be said to form a network of look-up tables that together represent the cryptographic operation. A look up table is a type of basic block which can be used to compute a part of the cryptographic operation, e.g., to produce an intermediate result. The system may comprise further basic computing blocks, e.g., formula's implemented in computer software, which may also be used, together with the network. The network of look-up tables may depend on each other directly, e.g., some look-up table may receive directly as input an output of another look-up table. The dependency may also be indirectly, e.g., via some type of basic block which is arranged in-between two look-up tables. For example, the white-box cryptographic system may comprise a number of, possibly parallel, table lookups, followed by an XOR operation which is not implemented as a table look-up, followed by further table lookups, etc.

A look-up table may be implemented in hardware, for example, as a computer chip. A look-up table may use a switch board, a state machine or any other suitable construction for implementing functions in computer hardware. A look-up table may also be implemented in software running on a general purpose computer chip, e.g. a microprocessor. For example, a look-up table may use a plurality of computer instructions, including arithmetical instructions, which together implement the functionality of the look-up table. A preferred implementation for the key translation unit, which may be used both in software and hardware, is a look-up table. A look-up table implementation comprises a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Note that a loop-up table may also be implemented in hardware gates by converting the look-up table to a Boolean function. Several techniques to do this are known, e.g., using Karnaugh maps.

Using look-up tables has the advantage that they can be obfuscated relatively straightforwardly. For example, the output values of a table may be encoded in some manner, by replacing the un-encoded values with the encoded values.

A look-up table for a function may, for example, be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which may have the same dimensions and may take the same number of input bits to produce the same number of output bits. The input encoding and output encoding used in such obfuscation are not explicit in the final white-box implementation.

The network of look-up tables are arranged to compute an output message when they are presented with an input message. Typically, the input message is operated upon by a number of basic input tables. A number of further look-up tables may take input from one or more of the basic input tables and/or from the input message. Yet further look-up tables can take input in any combination of the input message, the output of basic input tables and the output of the further look-up tables. Finally some set of basic exit tables, i.e., at least one, produce as output all or part of the output-message. In this manner a network of look-up tables emerges which collectively computes the mapping from the input message to the output message.

The key used is preferably a cryptographic key, and preferably contains sufficient entropy to withstand an anticipated brute force attack. The key may be taken to be a collection of round keys.

One or more of the intermediate results used during the computation of the cryptographic results, for example, intermediate results in the network, are encoded using one or more internal encodings. Encoding of intermediate results contributes to the strength of the white-box implementation. That is, internal encodings, especially if these encodings are chosen randomly and/or specifically for a particular white-box implementation, make it harder to recover the particular key and/or further key for which the system is configured.

In an embodiment, at least one specific look-up table of the plurality of look-up tables is adapted for the particular cryptographic key. The system is arranged for mapping the input-message to the output-message via at least the specific look-up table to arrange the effect of the specific look-up table on the cryptographic operation to being adapted for the further cryptographic key.

The content of some of the look-up tables depends on the particular key. For example, during the construction of the white box implementation they are specifically adapted for the particular key. For example, they may contain a key addition, possibly, along with other operations with which the key addition is combined. This gives the possibility of adapting a specific key translation table specifically for the specific look-up table. This decreases its complexity.

A specific look-up table depending on the key, has the advantage that the number of key bits, i.e., the amount key-data, on which the specific look-up table depends may be smaller than the total number of key bits. For example, the block cipher DES needs 768 key bits (16 rounds with a round key of 48 bit). However, one key addition may be as small as 6 bit. A key translation table adapted for such a small key addition is of less complexity than a key addition for a larger (sub) keys. It is observed that many block ciphers, including DES and AES, can be specified with a key schedule which computes round keys from one smaller key. For example, the 768 bit of rounds keys for DES can be computed from a single 56 bit key. However, the representation in round keys may be more convenient for white-box cryptography, as it avoids the problem of obfuscating the key schedule. Moreover, a key schedule represents additional logic which might provide an attacker with a new attack vector. However, it is noted that this is not necessarily the case, and the white-box system could employ an obfuscated key schedule to further reduce key length.

In an embodiment, the specific lookup table has the property that a specific lookup table adapted for the further key can be obtained by adding a, possibly encoded, offset to the input and/or by adding a, possibly encoded, offset to its output. That is by adding a fixed number to all inputs of the specific lookup table, before the input is processed using the specific lookup table, and/or adding a further fixed number to all the outputs of the specific lookup table, after the specific look-up table has processed its input, the same effect is achieved as would be achieved if the specific lookup table were replaced with a different look-up table adapted for the further cryptographic key.

The key translation unit can be embodied in a variety of ways. For example, the key translation unit may comprise one or more look-up tables. For example, the key translation table may comprise an XOR table, e.g. a type IV table. To XOR larger keys, the key translation unit may also be two or more of these tables. Furthermore, the key translation unit may be implemented in software. To express more complicated relationships between intermediate data adapted for the particular key or for the further key, this type of key translation table is well suited. The key translation unit may also be expressed in one or more formulas. For example, the key translation unit may be addition which is not expressed as look-up table but which is done using, e.g., hardware gates or commands for a microprocessor.

In an embodiment, the first input of the key translation unit depends on the input message by means of one or more of the plurality of look-up tables and wherein the system is arranged for the specific look-up table to receive an input depending on an output of the key translation unit. For example, the input of the specific look-up table may comprise the output of the key translation unit.

By making the input of the specific look-up table dependent on the output of the key translation unit the effect is achieved that inputs to the specific table are directly influenced. In this way the inputs intended for the specific look-up table can be pre-transformed so that the total effect of the key translation unit and the specific look-up table is as if the specific look-up table has been adapted for the further key.

For example, suppose a first input value is mapped by the specific look-up table to a first output value, which is consistent with the mapping that corresponds to the particular key. Also suppose that according to the mapping corresponding to the further key, the first input value should be mapped to a second output value. The key translation unit maps may then map the first input value to a second input value, which is chosen such that the specific look-up table maps the second input value to the second output value according to the mapping corresponding to the particular key. The effect which is achieved when the key translation unit and the specific look-up table are combined is that the effect of the specific look-up table on the cryptographic operation is adapted for the further cryptographic key, at least in so far as the first input value is concerned. To recapitulate, the first input value is mapped to the second input value, by the key translation unit, which is mapped to the second output value, by the specific look-up table. Together this mapping amounts to mapping the first input value to the second output value. This mapping may also be done for the other input values of the specific table, that is, translating input values meant for the further cryptographic key to input values for the particular cryptographic key. In other words, even though the specific table itself is adapted to the particular key, to the network, and to the system, it seems as if the specific table is adapted for the further key.

The key substitute does not need to have a direct relation with the further cryptographic key. Rather the key substitute instructs the system how to reconfigure the system to re-use operations adapted to the particular key as operations adapted for the further key. Hence the value to an attacker of the key substitute is limited. Moreover, the key translation unit may be configured to receive the second input, i.e., the key substitute, encoded according to a key substitute encoding. As the key substitute encoding can be chosen in any way, e.g., linear and/or non-linear, e.g. as a random encoding, this further obfuscates the relation between the key substitute and the further cryptographic key.

In a preferred embodiment, the key translation look-up table is configured with an output-encoding, and wherein the specific look-up table is configured with an input encoding corresponding to the output encoding.

If the input of the specific look-up table were not encoded, than an attacker could theoretically compare the processing of the cryptographic system with and without a key update. He could then observe how the inputs to the specific look-up table change. From this observation he may derive information on the difference between the particular key and the further key. Even though the particular key is secret and should be unknown to an attacker, revealing this information may be an undesirable situation. To avoid this, the interface between the key translation unit and the specific look-up table is further obfuscating using an encoding. Just as the key substitute encoding, this encoding may be chosen in any desired way. It has the effect that an offset which is introduced by the key translation unit is obfuscated through the encoding.

In an embodiment, the system is configured for the first input to depend on an output data of the specific look-up table. For example, the first input may comprise output data of the specific look-up table.

The output message depends on the key translation unit which processes the output data of the specific look-up table. Hence the way the output message depends on the output of the specific look-up table can be modified via the key translation unit and thus via the key substitute.

An example, analogous to the example above can clarify how the key translation unit can change the effect of the specific look up table by processing output data of the specific lookup table. For example, suppose a first input value is mapped by the specific look-up table to a first output value, which is consistent with the mapping that corresponds to the particular key. Also suppose that according to the mapping corresponding to the further key, the first input value should be mapped to a second output value. The key translation unit may then map the first output value to the second output value. The effect which is achieved when the specific look-up table and the key translation unit are combined is that the effect of the specific look-up table on the cryptographic operation is adapted for the further cryptographic key. To recapitulate, the first input value is mapped to the first output value which is mapped to the second output value. Together this mapping amounts to mapping the first input value to the second output value. The key translation unit may perform this translation of outputs of the specific table adapted for the particular key to outputs that correspond to the further key for all output values. In other words, even though the specific table itself is adapted to the particular key, to the network, and to the system, it seems as if the specific table is adapted for the further key.

In a preferred embodiment, the specific look-up table is configured with an output-encoding, and the key translation unit is configured with an input encoding corresponding to the output encoding of the specific look-up table.

Also the interface between the output of the specific look-up table and the key translation unit may be obfuscated further. This has the advantage that the relation between outputs of the specific look-up tables for different keys, even if it were observed by an attacker does not leak any information, since the output encoding is not known to him.

In a preferred embodiment, the key substitute comprises a difference between the further cryptographic key and the particular cryptographic key.

The key substitute represents to the network the further cryptographic key. This representation may be unique for the particular implementation of the network. That is, sending the same key substitute to a different network may not have the effect of updating the key of the different network. One way to achieve this is by representing the difference between the particular and the further key in the key substitute. If the specific look-up table of the other network corresponds to a different particular key, than the key substitute will not have the anticipated key-updating effect. Note that the use of a key substitute encoding also achieves this advantage, if the other network is implemented using a different key encoding. Using both measures further strengthens the binding between the key substitute and the particular white-box system for which it is intended.

In a preferred embodiment, the key translation look-up table is configured for adding the second input to the first input.

It is advantageous if the mapping that the key translation unit performs for input and/or output values of the specific table can be represented in an efficient manner. This reduces the space requirements of the key translation unit and the key substitute considerably, as there may be many possible inputs of the specific table. For example, a particular efficient way of mapping the values is by introducing an offset. Note that the first input may have to be encoded in case the key translation unit expects to receive encoded inputs.

Adding, e.g. of inputs, and computing of differences can be done with respect to various types of addition, for example, integer arithmetic, possibly using two's complement representation. Additions and subtractions are preferably performed using the XOR operation. It is noted that the sum and the difference of two bit-strings are computed in the same manner and produce the same result if XOR is used.

In a preferred embodiment, the specific look-up table comprises a cryptographic key addition operation of a sub-key depending on the particular key. The specific look-up table may be constructed by composing various operations together. For example, in case of AES, the specific look-up table may be composed of a key-addition and part of a Mix-Column operation. Moreover, typically input and output encodings will be used. In case the specific look-up table comprises a key addition the modifications to inputs and/or outputs may be represented by the key substitution as an offset with respect to the key addition. This reduces complexity and size requirements, both for the key substitute and for the key translation unit.

In a preferred embodiment, the cryptographic sub-key addition operation and the addition in the key translation look-up table of the second input to the first input are arranged to compose into a cryptographic key addition operation a further sub-key depending on the further cryptographic key.

If the operation performed by the key translation unit on its first input, in dependency on its second input, is composed as a function composition with the operation of the specific look-up table, then it is efficient if the two additions, the addition in the key translation unit and the addition in the specific-lookup table combine to produce a key addition of the intended key. The key translation look-up table may be implemented as a single table. However, the key translation unit may also be distributed over multiple look-up tables. For example, the key translation unit may be distributed over a table that affects the inputs of the specific look-up table and over a table that affects the output of the specific look-up table.

In an embodiment, the key translation look-up table is arranged to receive the second input encoded with a second input encoding, and wherein the system is configured to receive a key substitute at least part of which is encoded with the second input encoding.

As noted above it is preferred if the relation between the key substitute and an unobfuscated key which would produce the same cryptographic operation in a non-white-box implementation is as tenuous as possible. One way to achieve this is by representing not the further cryptographic key itself but a difference, e.g. an offset, between the particular cryptographic key and the further cryptographic key. A further way to achieve this is to encode the key substitute using a secret encoding which is embedded in the key translation unit. One further way to accomplish this aim is to have input encoding and/or output encodings on the specific look-up table which makes it necessary to modify the inputs and/or outputs in an obfuscated manner according to the input encoding of the specific look-up table.

A further aspect of the invention is a cryptographic method for performing a keyed cryptographic operation mapping an input-message to an output-message.

The method comprises performing the cryptographic operation using a network of a plurality of look-up tables arranged for cryptographic operation, the network being adapted for a particular cryptographic key. The method comprises receiving a key substitute which represents to the network a further cryptographic key, and providing the a key translation unit with a first input depending on an intermediate cryptographic result of the network and a second input depending on the key substitute. Performing the cryptographic operation using the network comprises mapping the input-message to the output-message via the network and the key translation unit to arrange the effect of the network on the cryptographic operation to being adapted for the further cryptographic key.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc.

In a preferred embodiment, the computer program comprises computer program code means adapted to perform all the steps of a method according to the invention when the computer program is run on a computer. Preferably, the computer program is embodied on a computer readable medium.

A white-box cryptographic system is presented for performing a key-dependent cryptographic operation, such as AES. The system comprises a network of a plurality of look-up tables arranged for collectively performing the cryptographic operation, the network being adapted for a particular cryptographic key. By sending a key substitute which represents to the network a further cryptographic key a key translation unit can arrange the effect of the network on the cryptographic operation such that is adapted for a further cryptographic key. In this way the system can be updated to use the further key instead of the particular key.

Another white-box using an updatable key is given in a patent application of the same applicant and same inventor as the current applicant, with Ser. No. WO2010146140, and title 'White-box cryptographic system with configurable key using block selection' which was first filed on 19 Jun. 2009, incorporated herein by reference.

BRIEF DESCRIPTION OF THE DRAWINGS

These and other aspects of the invention will be elucidated hereinafter by reference to the drawings, wherein.

DETAILED DESCRIPTION OF EMBODIMENTS

Figure 1:
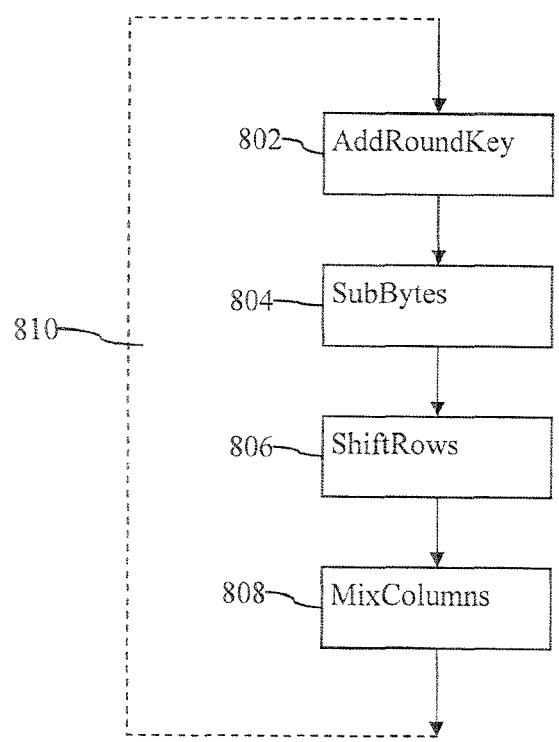
FIG. 1 is a diagram illustrating operations in a round of AES.

We will describe the workings of the invention using as an example a block cipher, the block cipher AES. However, this is done as an illustrative example only, as the invention can be more generally applied, to other block ciphers, e.g. DES, but more generally also to other cryptographic primitives, for example, hash functions.

In overview the following may be done. The block cipher AES is first converted into a form using only a network of look-up tables for its computations. Converting all cryptographic primitives to look-up tables is not necessary. In fact some of the computation may be performed using primitives in other forms than look-up tables. Below we will show how AES may be performed using only look-up tables, but not all conversions need to be adopted. The conversion to a network of look-up tables is done for a particular key. The precise key can, for example, be chosen to be the all zero key, or any random key. Although explicit reference to the key will disappear in this process, it will turn out that the contents of some look-up tables will depend on the key. Some look-up tables only depend on implementation choices, e.g., the obfuscating encodings that are used, etc, whereas other look-up tables also depend on the key.

One way to make the key for which the white-box implementation is adapted updatable is by introducing key translation units. A key translation unit may be placed in front of a look-up table. The inputs that are to be sent to the key dependent look-up table are routed through the key translation unit so that the key translation unit may modify them. The modifications that are performed on the data before they are passed to the key-dependent look-up table are dependent on a key substitute. The specific look-up table may continue to perform the same mapping, but, in a manner of speaking, the mapping is translated to the remainder of the network of look-up tables.

The key substitute represents, at least to the network, the further cryptographic key. A key substitute may be entirely different from another key substitute that represents the same further cryptographic key but to another white-box implementation of the cryptographic implementation. The reason behind this is that the key substitute may be represented with respect to the particular cryptographic key for which the network is adapted, and these may be chosen differently for different white-box networks. Moreover, the key substitute may be obfuscated using encodings, which may also be chosen different in the other white-box. Finally, the key substitute may have to take into account the encodings used for inputs and/or outputs of the specific look-up table.

Another possibility is to position a key translation unit after the key-dependent look-up table. The outputs of the key-dependent look-up table that are to be sent to the remainder of the network of look-up tables are routed through the key translation unit so that the key translation unit may modify them. The modifications that are performed on the data after they are passed through the key-dependent look-up table are dependent on a key substitute.

Modifying the inputs and outputs of key-dependent look-up tables may be combined. For each key-dependent look-up table that is to be updatable a key translation unit may be used. However, one key translation unit may be re-used for multiple key-dependent look-up tables. For example, re-use is possible if two tables are adapted for the same key, e.g., same part of a round key, and use the same encodings. To make the implementation fully key-updateable all key dependent look-up tables must be updateable. However, it is not necessary that all tables are made updateable in the manner described herein. Other techniques may be combined, for example, some look-up tables may be adapted to a new key by replacing them entirely. It is also possible to construct multiple copies of some key-dependent look-up tables before-hand, each one adapted to a different key. Later a table selection string may be received selecting the key-dependent table which is to be used. Combining different techniques has the advantage of further obfuscating the key updating procedure.

AES is a block cipher with a block size of 128 bits or 16 bytes. The plaintext is divided in blocks of 16 bytes which form the initial state of the encoding algorithm, and the final state of the encoding algorithm is the cipher text. To conceptually explain AES, the bytes of the state are organized as a matrix of 4×4 bytes. AES consists of a number of rounds. Each round is composed of similar processing steps operating on bytes, rows, or columns of the state matrix, each round using a different round key in these processing steps.

FIG. 1 illustrates some main processing steps of a round of AES. The processing steps include:

AddRoundKey 802—each byte of the state is XOR'ed with a byte of the round key.

SubBytes 804—A byte-to-byte permutation using a lookup table.

ShiftRows 806—Each row of the state is rotated a fixed number of bytes.

MixColumns 808—Each column is processed using a modulo multiplication in $GF(2^8)$.

The steps SubBytes 804, ShiftRows 806, and MixColumns 808 are independent of the particular key used. The key is applied in the step AddRoundKey 802. Except for the step ShiftRows 806, the processing steps can be performed on each column of the 4×4 state matrix without knowledge of the other columns. Therefore, they can be regarded as 32-bit operations as each column consists of 4 8-bit values. Dashed line 810 indicates that the process is repeated until the required number of rounds has been performed.

Each of these steps or a combination of steps may be represented by a lookup table or by a network of lookup tables. If the AddRoundKey step were implemented by XOR'ing with the round key, then the key is visible to the attacker in the white-box attack context. The AddRoundKey step can also be embedded in lookup tables, which makes it less obvious to find out the key. In fact, it is possible to replace a full round of AES by a network of lookup tables. For example, the SubBytes, ShiftRows, and MixColumns steps may be implemented using table lookups. Below we will discuss a possible white-box implementation of AES more fully. First we will present white box implementation techniques with respect to a fixed key, then we will describe how to extend the implementation to an updatable implementation. It is noted that one may also choose to create an updatable implementation directly, without going through the intermediate step of producing a white-box implementation adapted to a single fixed key.

Figure 2:
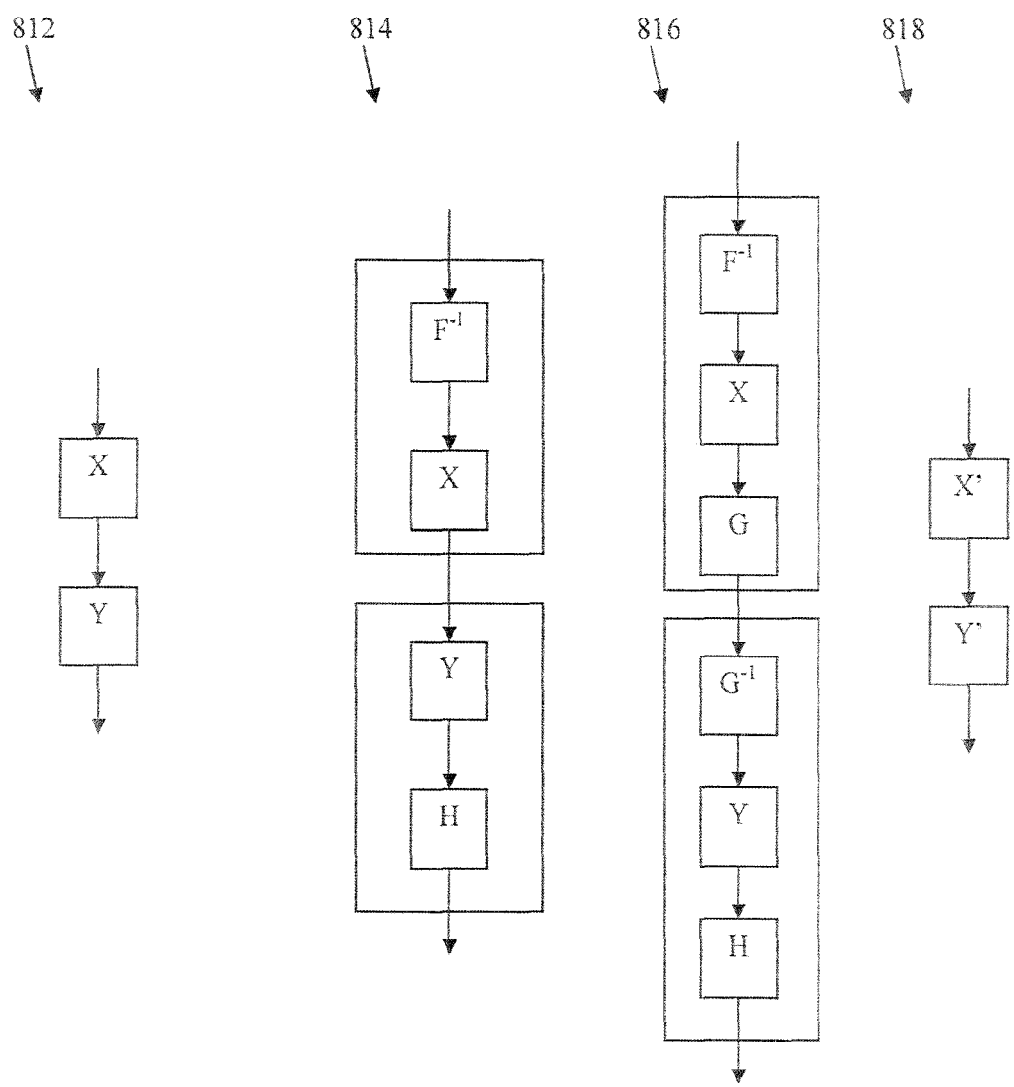
FIG. 2 is a diagram illustrating an example of obfuscating tables.

FIG. 2 illustrates a way to make it even more difficult to extract the key. After a cryptographic operation, such as an AES encryption, has been transformed into a network of basic operations, further obfuscation is possible. Let X and Y be two functions, i.e., basic operations. Consider the composite operation $Y \circ X = Y(X(c))$, illustrated as diagram 812, that is, to obtain the composite operation, Y is performed after X. Here c is an input value, for example, a 4-byte state column. However, the approach applies to any type of input value c. Mappings X and Y can be implemented as look-up tables which can be stored in memory, however, when they are stored in memory the values can be read by an attacker. Diagram 814 illustrates how the contents of the look-up tables can be obfuscated by using an input encoding F and an output encoding H. Look-up tables corresponding to $X \circ F^{-1}$ and $H \circ Y$ are stored as illustrated instead of X and Y, making it more difficult to extract X and Y. Diagram 816 shows how to add an additional, for example, random, bijective function G, such that the intermediate result of the two tables is also encoded. In this case, two tables are stored in memory: $X' = G \circ X \circ F^{-1}$ and $Y' = H \circ Y \circ G^{-1}$. This is illustrated once more in diagram 18:

$$Y' \circ X' = (H \circ Y \circ G^{-1}) \circ (G \circ X \circ F^{-1}) = H \circ (Y \circ X) \circ F^{-1},$$

where $\circ$ denotes function composition as usual (i.e., for any two functions $f(x)$ and $g(x)$, $f \circ g(x) = f(g(x))$ by definition), X and Y are functions suitable for implementation by means of look-up tables. Likewise a network consisting of more than two functions can be encoded. The actual tables encoding X and Y are obfuscated by combining $H \circ Y \circ G^{-1}$ in a single look-up table and combining $G \circ X \circ F^{-1}$ in a single look-up table. As long as F, G, and/or H remain unknown, the attacker cannot extract information about X and/or Y from the look-up tables, and hence the attacker cannot extract the key that is the basis for X and/or Y. Other cryptographic algorithms, including DES and Rijndael (of which AES is a particular instantiation), may also be encoded as a cascade or network of look-up tables that may be obfuscated in a way similar to the above. The invention is not limited to the exemplary cryptographic algorithms mentioned.

Chow 1 discloses a method with the intent to hide the key by encoding its tables with random bijections representing compositions rather than individual steps. Preventing secret-key extraction has the advantage that an attacker is prevented from extracting keying material which would allow software protection goals to be bypassed on other machines, or from publishing keying material effectively creating 'global cracks' which defeat security measures across large user-bases of installed software. It provides an increased degree of protection given the constraints of a software-only solution and the hostile-host reality. In the approach of Chow 1, the key is hidden by (1) using tables for compositions rather than individual steps; (2) encoding these tables with random bijections; and (3) extending the cryptographic boundary beyond the crypto algorithm itself further out into the containing application, forcing attackers (reverse engineers) to understand significantly larger code segments to achieve their goals. Chow 1 discusses a fixed key approach: the key(s) are embedded in the implementation by partial evaluation with respect to the key(s), so that key input is unnecessary. Partial evaluation means that expressions involving the key are evaluated as much as reasonably possible, and the result is put in the code rather than the full expressions. This in itself somewhat hides the key as it now resides throughout the implementation, but furthermore, the efficient techniques of obfuscating look-up tables can be applied to hide the key.

A possible attack-scenario is for an attacker to extract a key-specific implementation and use it instead of the key. This problem can be mitigated by designing the key-specific implementation tailored to function as a component of a larger containing system. The larger system can be arranged to provide the component with input in a manipulated or encoded form. When the key-specific implementation is removed by an attacker and inserted in a different larger system, the key-specific implementation will not function properly since the different larger system will not provide its input in the manipulated form expected by the key-specific implementation.

Referring to the step of encoding tables, since encodings are arbitrary, results are meaningful only if the output encoding of one step matches the input encoding of the next. For example, if step X is followed by step Y (resulting in computation of $Y \circ X$), the computation could be encoded as $$Y' \circ X' = (H \circ Y \circ G^{-1}) \circ (G \circ X \circ F^{-1}) = H \circ (Y \circ X) \circ F^{-1}.$$

This way, $Y \circ X$ is properly computed albeit that the input needs to be encoded with F and the output needs to be decoded with $H^{-1}$. The steps are separately represented as tables corresponding to Y' and X', so that F, G, and H are hidden as well as X and Y.

Apart from such confusion steps, Chow 1 uses diffusion steps by means of linear transformations to further disguise the underlying operations. The term mixing bijection is used to describe a linear bijection, used in the above sense. The implementation of Chow 1 takes input in a manipulated form, and produces output in a differently manipulated form, thereby making the white-box AES implementation difficult to separate from its containing application. Note that the mixing bijection represents additional obfuscating means and are not necessary to implement AES functionality. If more obfuscation is necessary then a white-box according to the invention may also be combined with other obfuscation techniques.

Chow 2 discusses a cryptographic implementation of DES designed to withstand white-box attacks that aim at extracting secret keys from the program. The techniques discussed in this paper about obfuscating look-up table networks apply for a large part also to other cryptographic algorithm including AES and others. While an attacker controlling the execution environment can clearly make use of the software itself (e.g. for decryption) without explicitly extracting the key, forcing an attacker to use the installed instance at hand is often of value to digital rights management (DRM) systems providers. In general, the approach in Chow 2 is to work towards an implementation consisting entirely of substitution boxes, none of which implement affine transformations. A number of techniques, described in Chow 2, support the general approach. Some of these techniques are I/O-blocked encoding, combined function encoding, by-pass encoding, split-path encoding, and output splitting.

Partial evaluation means that expressions based on values (partially) known at the time of implementation are pre-evaluated. In a simplified example, when the key is '5', and the original implementation contains the expression '2*key', then rather than incorporating '2*5' in the implementation, the pre-evaluated expression '10' is put in the implementation. This way, the key '5' is not directly present in the code. In the case of DES with a fixed key, this involves replacing standard S-boxes with key-specific pre-evaluated S-boxes, e.g., computed from the key at or before compilation time. A mixing bijection according to Chow 2 is a bijective linear transformation designed such that each output bit depends on a large number of input bits. I/O-blocked encoding is an encoding method for handling large numbers of input and output bits. In this case, the encoding/decoding can be formed as a concatenation of encodings, where each encoding deals with a subset of the input/output bits. Combined function encoding means that if two or more operations can be processed in parallel, a single encoding function is applied to the concatenation of the inputs (respectively outputs) of the parallel operations. It is more or less the opposite of I/O-blocked encoding. By-pass encoding means that the encoding transformation adds a number of superfluous bits of entropy to the input and/or output of the transform to be obfuscated, and redesign the transform to be obfuscated to "by-pass" the superfluous bits such that they do not affect the final output of the procedure. Split-path encoding means that a function is modified to provide additional output bits for obfuscating the essential information bits. Output splitting means that the output of a function is distributed over several partial functions, where the output of all partial functions must be combined, preferably in a non-obvious way, in order to obtain the original output of the function.

Chow 2 proposes building encoded networks to construct S-boxes with wide input of, say, 32 bits or even 96 bits. Such a wide-input S-box is divided into a network of S-boxes each having a more narrow input and output; each of the S-boxes is encoded by incorporating an encoding function in the S-box. The inverse of the encoding function is incorporated in the further S-box processing the output of the S-box. To put this in other words, the further S-box has an input encoding which is the inverse of the output encoding of the S-box.

A White Box Implementation of AES

To improve to clarity of the exposition, we will first describe a possible white-box implementation of a block cipher, in this case AES. Below we will indicate how the white-box may be adapted such that the precise cryptographic operation that it performs may be changed afterwards by sending it an updating string. It is noted, that the problem the invention seeks to solve is not just restricted to the particular implementation given below, but is endemic to white-box implementations in general. We refer to Chow 1, in particular section 2.2 to section 3.6, for more details on known white-box implementations.

A White-box AES implementation can be sketched as follows. The input to the AES encryption and decryption algorithm is a single 128-bit block. This block is represented by a 4×4 matrix consisting of 16 bytes. AES usually consists of 10 rounds for AES-128. Each round updates a set of sixteen bytes which form the state of AES, thus each AES round processes 128 bits. AES-128 uses a key of 128 bits. This key serves as input for an algorithm which converts the key into different round keys of 128 bits. A basic round consists of four parts:
  SubBytes
  ShiftRows
  MixColumns
  AddRoundKey.

This order of operations applies to AES encryption. Although the standard order of operations in AES decryption is different, it is possible to rewrite the AES decryption algorithm to have the same order of operations as for AES encryption.

Before the first round, an extra AddRoundKey operation occurs, and from round ten the MixColumns operation is omitted. The only part that uses the key is AddRoundKey, the other three parts do nothing with the key. In the implementation the boundaries of the rounds are changed to integrate the AddRoundKey step and the SubBytes step of the next round into one step. A round begins with AddRoundKey and SubBytes followed by ShiftRows and finally MixColumns.

First, the key is hidden by composing the SubBytes step and the AddRoundKey together into one step. This makes the key no longer visible on its own. Because the key is known in advance, the operations involving the key can be pre-evaluated. This means that the standard S-Boxes which are used in the step SubBytes can be replaced with key-specific S-Boxes. To generate key-specific instances of AES-128, the key is integrated into the SubBytes transformations by creating sixteen 8×8 (i.e. 8-bit input, 8-bit output) lookup tables $T_{i,j}^r$ which are defined as follows:

$$T_{i,j}^r(x) = S(x \oplus k_{i,j}^{r-1}), i=0,\ldots,3; j=0,\ldots,3; r=1,\ldots,9,$$

where S is the AES S-box (an invertible 8-bit mapping), and $k_{i,j}^r$ is the AES sub-key byte at position i, j of the 4×4 matrix which represents the round key for round r. These T-boxes compose the SubBytes step with the previous round's AddRoundKey step. The round 10 T-boxes absorb the post-whitening key as follows:

$$T_{i,j}^{10}(x) = S(x \oplus k_{i,j}^9) \oplus k_{sr(i,j)}^{10}, i=0,\ldots,3; j=0,\ldots,3,$$

where sr(i,j) denotes the new location of cell i,j after the ShiftRows step. The total number of T-boxes is 10×16=160. However, the key can easily be recovered from T-boxes because S is publicly known. This makes additional encodings necessary. Linear transformations are used for diffusing the inputs to the T-boxes. These linear transformations are called mixing bijections and can be represented as 8×8 matrices over GF(2). The mixing bijections are inverted by an earlier computation to undo their effect.

Figure 3:
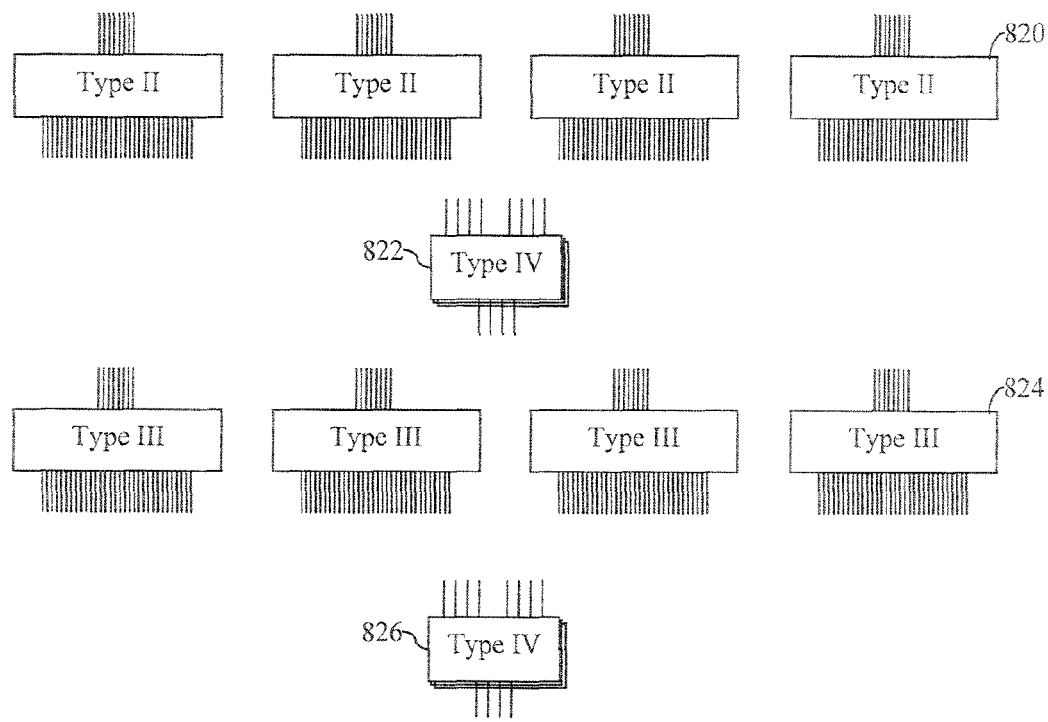
FIG. 3 is a diagram illustrating a round for a column in a white-box AES implementation.

FIG. 3 illustrates the tables involved in a round of white-box AES for one 32-bit column of the state (after applying ShiftRows). The three other 32-bit columns are handled in the same way, although the tables have a different content since for those columns different key values may be used. Moreover, different encoding may be applied to the other columns.

The names of the different types of tables are introduced here. They are discussed in more detail hereinafter. Before the rounds, each byte of the 128-bit state is applied to a respective type Ia table. This results in respective 128-bit values which are XOR'ed using a network of type IV tables to provide a 128-bit output that is divided into four 32-bit values. The processing steps of each 32-bit value are outlined here. The four bytes of the 32-bit value are input to four respective type II tables 20. Each of the four type II tables 20 result in a 32-bit output. These outputs are bitwise XOR'ed using type IV tables 22. Each type IV table 22 performs a 4-bit bitwise XOR. By properly connecting inputs and outputs of type IV tables, the bitwise XOR of the four 32-bit outputs can be realized as will be understood by the skilled artisan. The result of this step is a 32-bit value. Each of the four bytes of this value is applied to a respective type III table 24. Each type III table provides a 32-bit output. These outputs are again bitwise XOR'ed using a network of type IV tables 26 similar to the network of type IV tables 22. The output is a 32-bit value indicative of a column of the state. This is repeated for each round.

After the rounds have been performed for each of the four 32-bit values, the outputs are combined into a 128-bit value. Each byte of the 128-bit value is applied to a type Ib table; the results are XOR'ed using a network of type IV tables.

Figure 4:
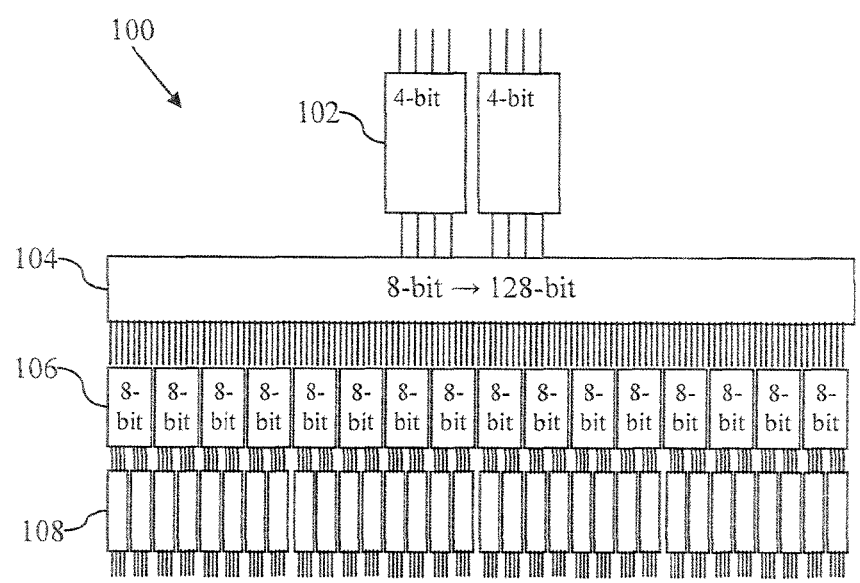
FIG. 4 is a diagram illustrating mappings incorporated in a type Ia table.
Figure 5:
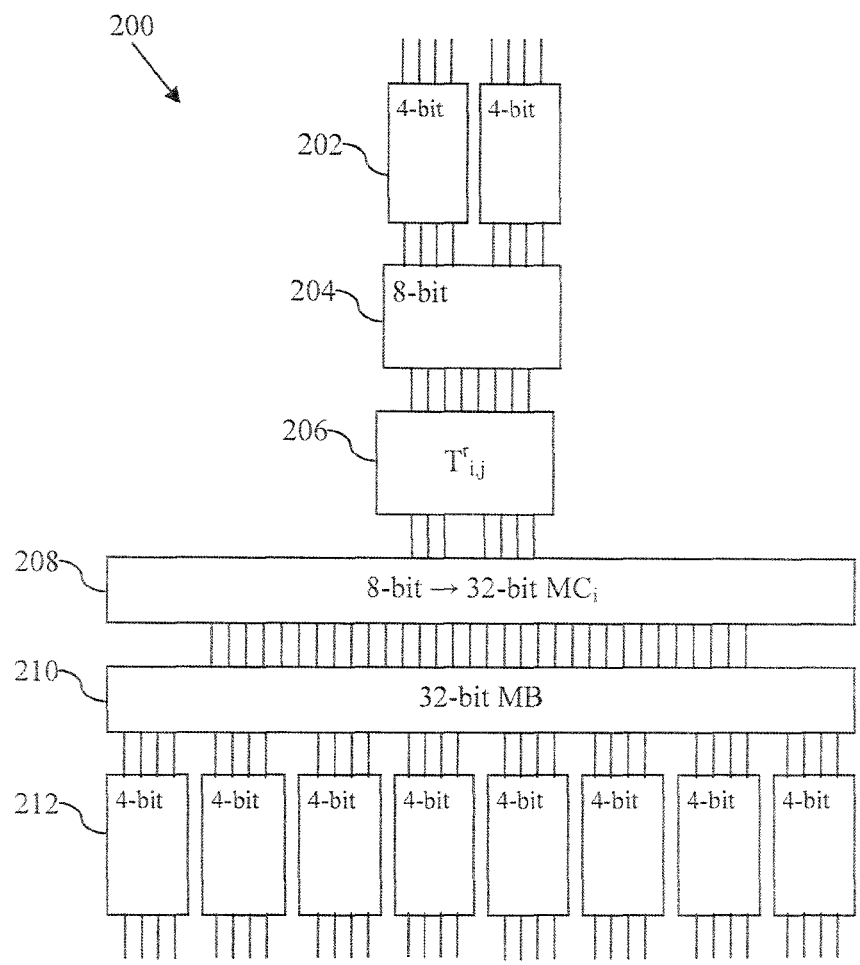
FIG. 5 is a diagram illustrating mappings incorporated in a type II table.
Figure 6:
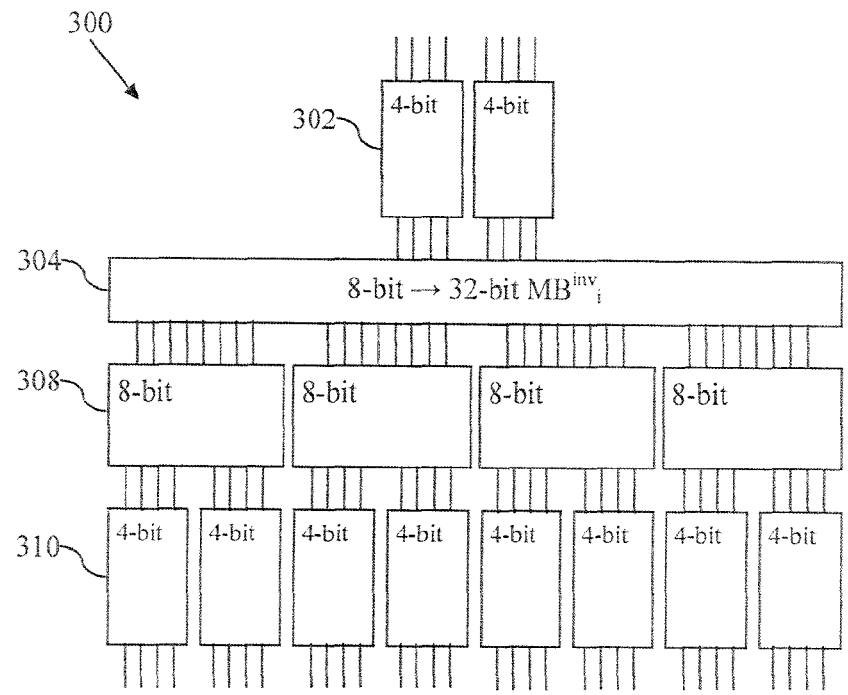
FIG. 6 is a diagram illustrating mappings incorporated in a type III table.
Figure 7:
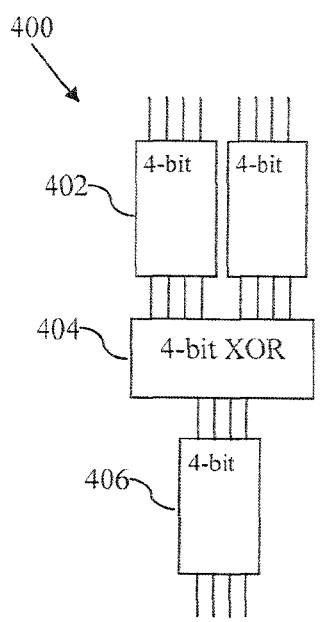
FIG. 7 is a diagram illustrating mappings incorporated in a type IV table.
Figure 8:
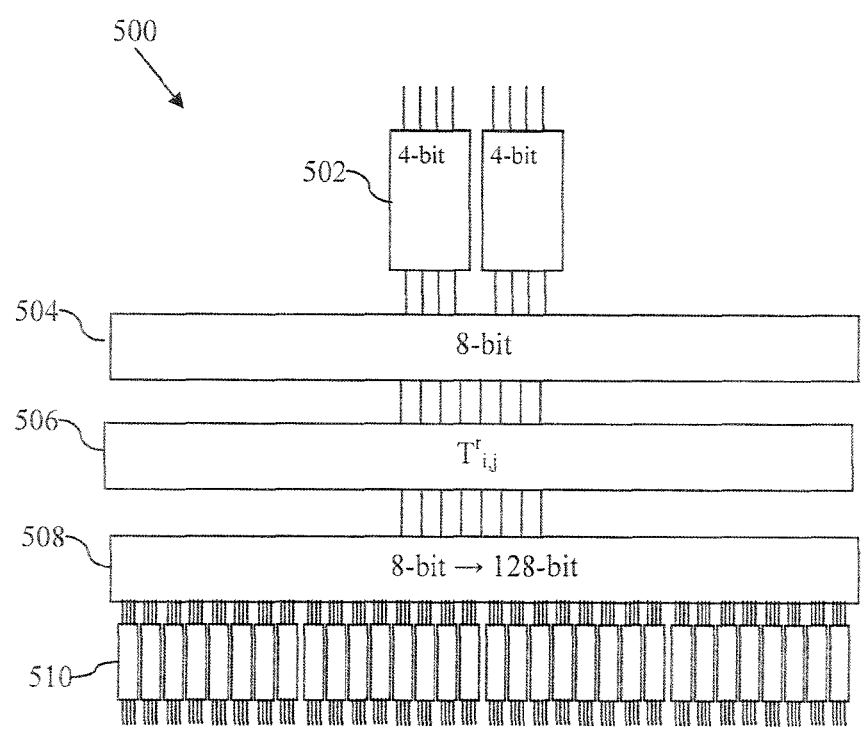
FIG. 8 is a diagram illustrating mappings incorporated in a type Ib table.

FIG. 4 illustrates a type Ia table 100. FIG. 5 illustrates a type II table 200. FIG. 6 illustrates a type III table 300. FIG. 7 illustrates a type IV table 400. FIG. 8 illustrates a type Ib table 500.

An AES state is represented by a 4×4 matrix consisting of bytes. The MixColumns step operates on a column (four 8-bit cells) at a time. Consider a 32×32 matrix MC, which implements the MixColumns operation. If this is represented by a table, this table would cost $2^{32} \times 32 = 137438953472$ bits=16 GB. In order to avoid such large tables the matrix is blocked into four sections.

MC is blocked into four 32×8 sections, MC0, MC1, MC2, MC3 (block 208). Multiplication of a 32-bit vector $x=(x0, \ldots, x31)$ by MC is done by dividing the bits of x into four bytes and multiplying each of the sections of MC with one of the bytes, yielding four 32-bit vectors ($z0, \ldots, z3$). This is followed by three 32-bits XORs giving the final 32-bit result z. The four tables together only cost $4 \times 2^8 \times 32 = 32768$ bits=4 KB.

The three XORs will be divided into 24 4-bit XORs, each represented by a possibly encoded look-up table, with appropriate concatenation (e.g. ((z[0, 0], z[0, 1], z[0, 2], z[0, 3])+ (z[1, 0], z[1, 1], z[1, 2], z[1, 3]))∥((z[0, 4], z[0, 5], z[0, 6], z[0, 7])+(z[1, 4], z[1, 5], z[1, 6], z[1, 7]))∥ . . . ), where ∥ denotes concatenation and + denotes XOR. By using these strips and subdivided XORs, each step is represented by a small lookup table. In particular, for $i=0, \ldots, 3$ the zi are computed using 8×32-bit tables. An 8×32-bit table has an 8-bit input and a 32-bit output. Such a table may be implemented by listing $2^8$ output values of 32 bit each. The 4-bit XORs become 24 8×4-bit tables. FIG. 7 illustrates how input decodings 402 and output encodings 406 can be put around the XORs 404. These encodings are usually randomly chosen non-linear 4×4 bijections. The XOR tables are called type IV tables 400. The type IV tables take as input 4 bits from each of two previous computations. The output encodings 212 of those computations are matched with the input decodings 402 for the type IV tables to undo each other. The choice for 4×4 non-linear bijections depended on the size of the tables. In this situation a type IV table is only $2^8 \times 4$ bits=128 bytes. 24 tables are needed which cost together 3 KB. If the XORs were not divided, three XOR tables would be needed which computed 32-bit XORs. The T-boxes 206 and the 8×32-bit tables 208 could be represented as separate lookup tables. Instead, they can be composed creating new 8×32-bit tables 200 computing the SubBytes and AddRoundKey transformations as well as part of MixColumns. This saves both space (to store the T-boxes) and time (to perform the table lookups).

Before splitting MC into MCi as above, MC will be left-multiplied by a 32×32 mixing bijection MB, illustratively indicated in FIG. 5 at reference numeral 210, chosen as a non-singular matrix with 4×4 sub-matrices of full rank. The use of mixing bijections increases the number of possible constructions for a particular table.

FIG. 5 illustrates an 8×32 type II table 200 including 4×4 input decodings 202 and 4×4 output encodings 212. These output encodings and input decodings are non-linear 4×4 bijections which must match the input decodings and output encodings of the type IV tables 400. The type II tables 200 are followed by type IV tables 400. In order to invert MB, an extra set of tables is used for calculating $MB^{-1}$. Let $(x'_0, \ldots, x'_{31})$ be the input to MixColumns, and let $(z_0, \ldots, z_{31})$ be the output after MixColumns. Let $(z'_0, \ldots, z'_{31})^T$ be the result after multiplication with MB. $(z'_0, \ldots, z'_{31})^T$ serves as input to the type III tables 300. Note that the input decodings and the output encodings need not be considered here because the output encoding of a table is undone by the input decoding of a next table. In the type III tables 300, $MB^{-1}$ is applied 304 and the inverses 308 of the four input mixing bijections 204 of the next round's four type II tables 200.

FIG. 6 illustrates an 8×32 type III table 300 including 4×4 non-linear input decodings and 4×4 non-linear output encodings. These tables are followed by corresponding type IV tables 400.

One round of data operations involves an operation on a 128-bit state matrix. The data operations performed on each of four strips of 32 bits of the 128-bit state matrix is as follows. The 32-bit strip is divided into four 8-bit bytes. Each of the four bytes is fed into a distinct type II table 200, resulting in four 32-bit output values. These values have to be XOR'ed using obfuscated type IV tables 400. To that end, each 32-bit output value is divided into eight 4-bit nibbles, and appropriate pairs of nibbles are input to respective type IV tables, such that the XOR of the four 32-bit output values is obtained in encoded form.

This 32-bit resulting encoded XOR'ed result is again divided into bytes, and each byte is input to a distinct type III table 300. The input decoding of each nibble of the type III tables corresponds to the output encoding of the last applied type IV tables. The type III tables again result in four 32-bit output values that are again XOR'ed using obfuscated type IV tables 400.

In summary, the rounds are implemented by lookup tables. The lookup tables of a single round are networked as follows. The data is fed into Type II tables. The output of these tables is fed to a network of Type IV tables representing encoded XORs. The output of this network is fed to Type III tables canceling the mixing bijection encoding that is inserted by the Type II tables. The encoded output of the round is finally derived by feeding the output of the Type III tables into, again, a network of Type IV tables representing encoded XORs.

Furthermore, the white-box implementation contains Type I tables at the beginning (type Ia table 100) and the end (type Ib table 500) for respectively canceling out and inserting external encodings. The type Ia table 100 can be used to apply a concatenation of mappings as illustrated in FIG. 4 by applying a single table look-up. In the concatenation, a 4-bit nibble input decoding 102 appears first. Then, an 8-bit to 128-bit mapping 104 appears; this mapping is part of an encoding of the input and output of the network; this mapping can be undone elsewhere in the program. Apart from the linear 8 bit to 128 bit mapping, also other tables may be part of the external encoding. For example, if Table 100 is comprised in the first round, then 102 may be included. Similarly, if Table 500 is in the last round encoding 212 may be included. The result of mapping 104 is split in 16 eight-bit pieces to which respective 8-bit bijections 106 are applied. Finally, the output nibble encoding 108 is applied. As mentioned, the cascade of mappings 102, 104, 106, and 108 is pre-evaluated and the final result is tabulated in a look-up table. This results in a table with at most 256 entries of 128 bits each. The concatenation of mappings incorporated in a type Ib table 500 is schematically displayed in FIG. 8. The first mapping is the input nibble decoding 502, which is followed by an 8-bit bijection 504, a T-box $T_{i,j}^r$ 506, where r corresponds to the last round, an 8-bit to 128 bit mapping for providing output encoding, and output nibble encodings 510. The 128-bit output of this kind of table is XOR'ed with the output of other type Ib tables, again making use of nibble input and output encoded type IV tables 400. The output encoding 508 is undone elsewhere in the program, i.e., outside the cryptographic part of the program. This makes it more difficult for an attacker to break the encodings of the tables by analyzing only an input and an output of the cryptographic part of the program.

An Improved White-Box Implementation of AES

White-box techniques, such as described, e.g., in Chow 1 and Chow 2 can be combined with each other in various ways to obtain white-box implementation of a wide variety of cryptographic operations, including block-ciphers, especially substitution-affine-transformation ciphers, streams ciphers, message authentication codes (MAC), etc. To convert AES into lookup tables the technique of partial evaluation was used. As a consequence the key has spread over the whole of the implementation. To make the white box implementation updatable the following changes can be made.

Referring again to FIG. 3, only the type II tables and the Type 1b tables depend on the key, since they incorporate a T-box. The other tables depend on the details of the cipher algorithm, (in this case AES), and the encodings chosen.

FIG. 3 shows all Type II tables needed for one column, i.e., 32 bits of intermediate data of one round of AES. One Type II table depends on 8 key-bits, that is, on 8 bit of one AES round-key. When viewed as a function composition this key dependency is done at the beginning of the function sequence, directly after the encodings, see FIG. 5. For this reason a convenient place to make type II tables updateable is to place a key translation units before the type II tables. A key translation unit that performs an XOR operation suffices in this case, since the key addition in a type II table is placed such that it can combine with an addition in the key translation unit. The key translation unit takes as a first input the output of a table, that is to be routed to an input of the type II table and as a second input a byte of the key substitute that corresponds to the type II table. It is noted that the input of a table, in particular a type II table, may come from multiple tables. For example, in an embodiment the input of a type II table comes from the outputs of two type IV tables. In this case both inputs of the type II table may be routed through a key translation unit. The key translation unit performs an XOR addition on the two inputs. Performing an XOR can be done be using, or reusing, two type IV tables. Each type IV table may perform an XOR on a nibble of the inputs of the first and second input.

Figure 9:
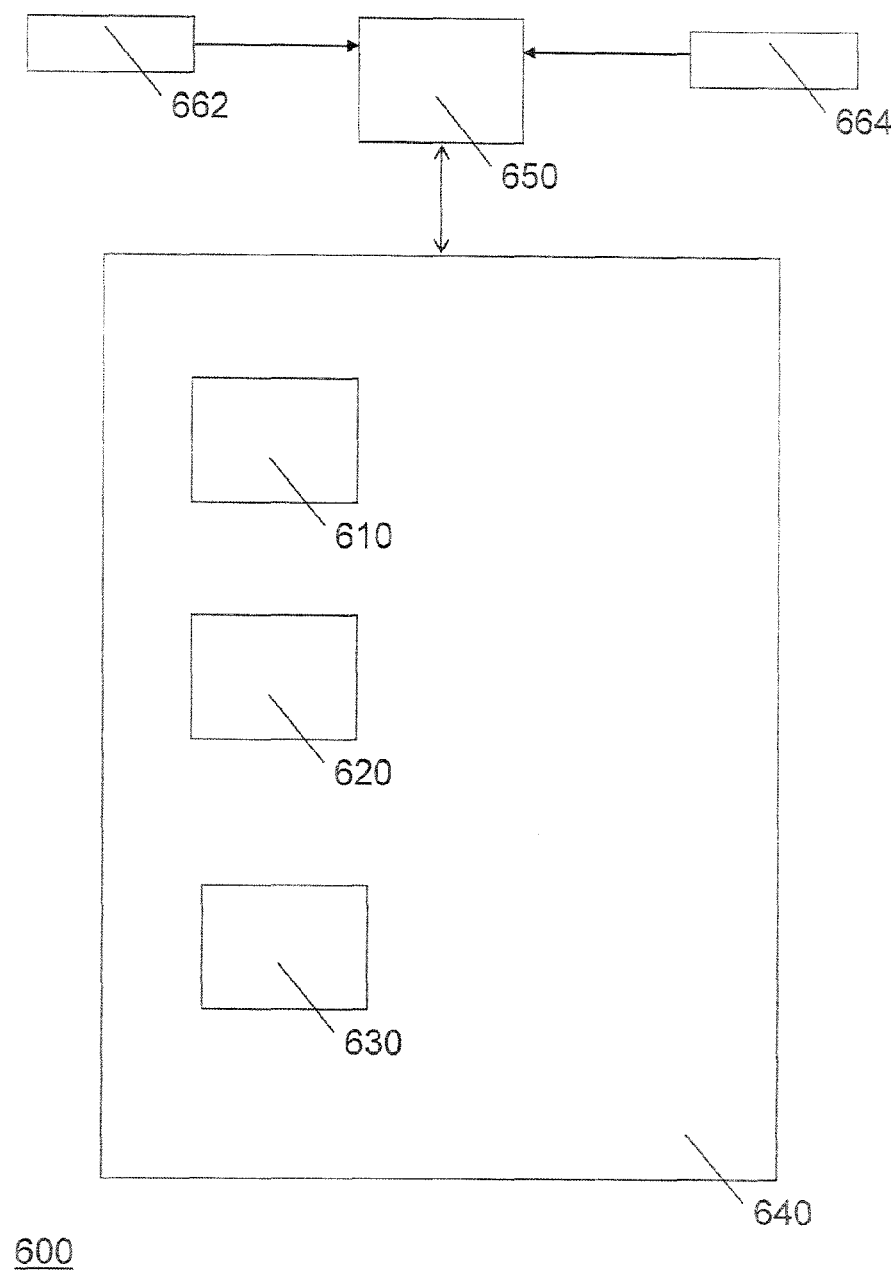
FIG. 9 is a diagram illustrating a white box implementation with an updatable key.

FIG. 9 illustrates cryptographic system 600. The system comprises a plurality of look-up tables 640. Of plurality 640 look-up tables 610, 620 and 630 are shown. Look-up table 630 is a specific look-up table that is adapted to a particular key. For example, look-up table 630 may be constructed by composing a T-box with one or more other operations. Look-up table 620 is a key translation unit. Look-up table 610 may for example provide inputs for look-up table 630. A look-up table takes one or more inputs and produces one or more outputs. Cryptographic system 600 comprises a look-up table manager 650 which has access to the blocks in plurality 640. The tables 640 may be stored in a memory to which manager 650 has access. Alternatively, the tables can be implemented as hardware chips using e.g. CMOS technology. Manager 650 may, for example, have access to the look-up tables via a bus.

Manager 650 itself may be implemented as a software program stored in a memory and executed using a general purpose processor (not shown). Alternatively, manager 650 may be implemented as a finite state machine in hardware. Manager 650 may have access to other cryptographic primitives, e.g., formulas implemented in software, during execution of a cryptographic operation.

Manager 650 is adapted to receive an input-message 662 and a key substitute 664. The key substitute 664 represents to the network the key that is to be used during the computation. For example, key substitute 664 may comprise multiple parts, each part corresponding to a key dependent look-up table of the plurality 640. Manager 650 may be configured to parse key substitute 664 and use different parts for different key translation units. For example, key substitute 664 may comprise 16 times 1 sub-key substitute. One sub-key substitute for each T-box which may be used in an AES white-box implementation. Key substitute 664 may be represented as bit string, or converted to an ASCII string if that is convenient.

There does not need to be a direct relation between the eventual key that will be used and the key substitute 664. Only the combination of the tables and the key substitute determine the key. Access to the key substitute 664 alone does not suffice to derive the key used in the cryptographic operation for which it configures the cryptographic system 600.

During operation, manager 650 receives key substitute 664 and input-message 662. Manager 650 parses key substitute 664 and determines which parts of key substitute 664 are needed for which key translation unit. A look-up table produces an output which comprises an intermediate result and/ or whole or part of the output message (not shown). The output message may be formed by combining, e.g., concatenating, the output of multiple specific look-up tables. Intermediate data, and combinations thereof, are used as inputs to further look-up tables in an iterative fashion until the look-up tables together have performed the cryptographic operation, or at least a substantive part thereof. The key translations table is provided with at least a part of the key substitute 664.

A key translation unit can be integrated with a key-dependent look-up table in various ways. A few examples are illustrated in FIGS. 10a, 10b and 10c.

Figure 10A:
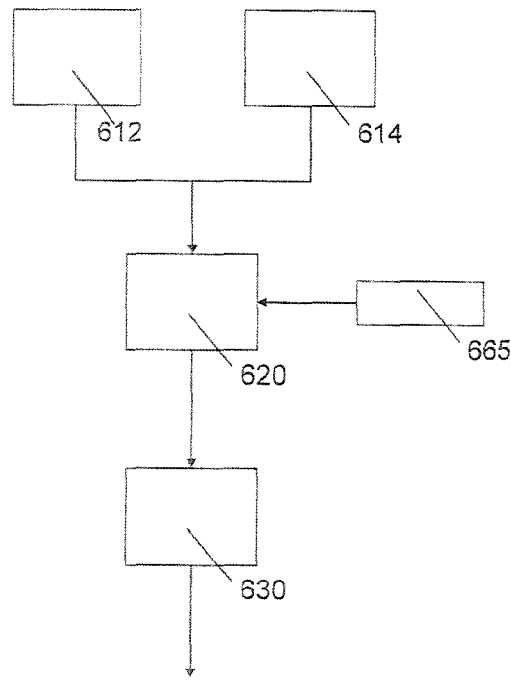
FIGS. 10a, 10b and 10c are diagrams illustrating a key dependent look-up table and a key translation unit.

FIG. 10a shows two look-up tables 612 and 614 which are located in the network of look-up tables before a key dependent table 630. For example, tables 612 and 614 are type IV tables, and look-up table 630 is a type II table. The outputs of tables 612 and 614 are used as a first input to key translation unit 620. Key translation unit receives a key substitute 665 as a second input, which is derived from key substitute 664. Key substitute 665 represents to the network the key on which table 630 depends. Before table 620 forwards the output of 612 and 614 they are translated such that the combination of tables 620 and 630 together perform the same cryptographic operation as table 630 but for a different key.

Figure 10B:
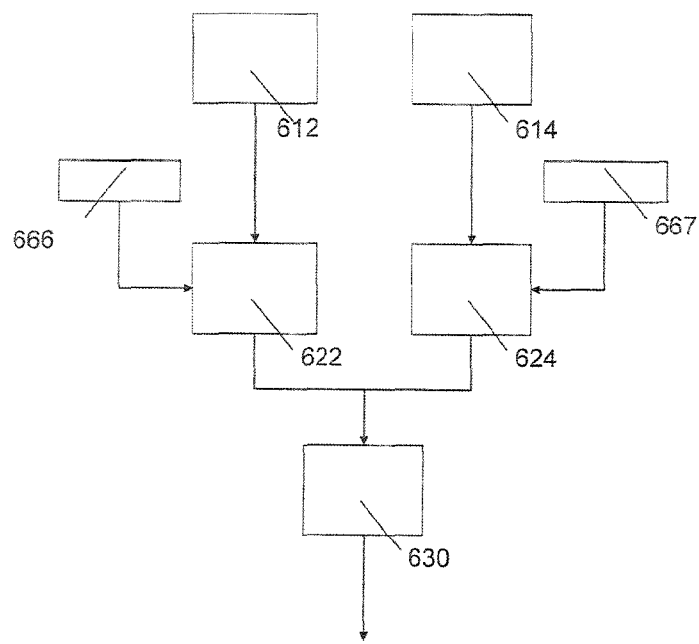

FIG. 10b elaborates on the situation in FIG. 10a. Key translation unit 620 is distributed over two smaller key translation units 622 and 624 who receive key substitutes 666 and 667 respectively as second input. For example, tables 622 and 624 are type IV tables, and table 622 XORs together key substitute 666 and the output of table 612. For example, table 624 XORs together key substitute 667 and the output of table 614.

Figure 10C:
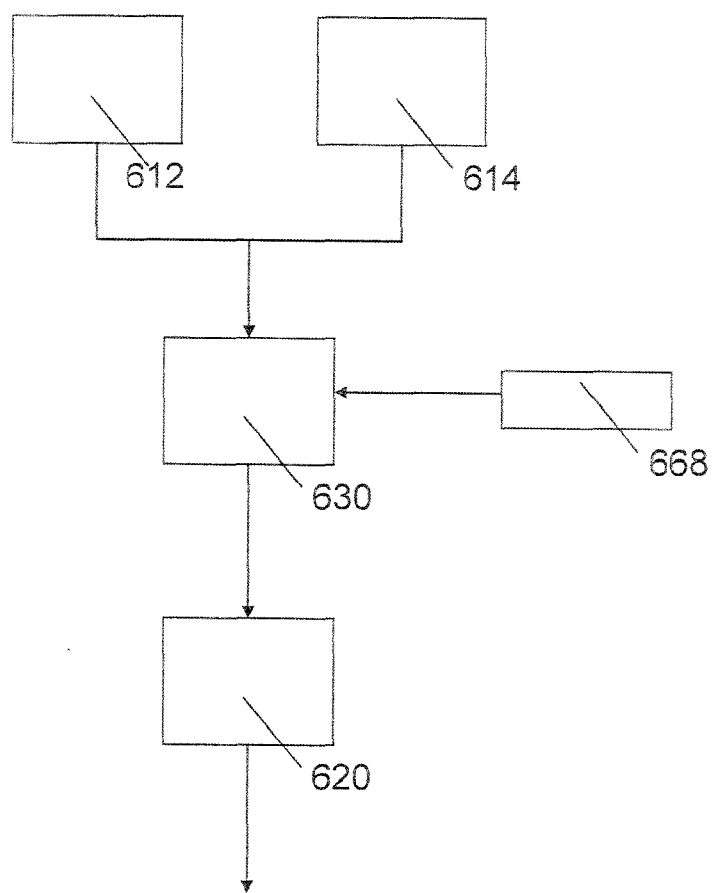

FIG. 10c represents a further possibility. Here key dependent table 630 receives his input directly from tables 612 and 614. A key translation unit 620 is placed to receive as first input the output of table 630 and as second input key substitute 668 to translate his results for a new key.

It is preferred to place the key translation unit after the key-dependent look-up table. This has the advantage that the effect of a key addition has influenced further intermediate results. As more bits depend on the key addition that one wishes to correct it becomes harder for an attacker to figure out how the key dependencies work. For example, part of the network may look as follows: type II tables, followed by a type IV network, followed by key translation units, followed by type III tables. One byte of intermediate data after the type IV network depends on 4 key bytes, instead of only one directly after the type II network. An operator who has access to the full round key can still express the necessary change to the byte as a single one byte offset, since the type IV network is linear.

We continue our description with respect to FIG. 9. After manager 650 has received input message 662 and key substitute 664, he forwards parts of the message to look-up tables. The results of those look-up tables are inputs for yet new look-up tables. When a key-dependent look-up table is needed, a corresponding key translation unit is provided with a corresponding key substitute, e.g., part of key substitute 664. At some point outputs of look-up tables are collected as the output message (not shown) of system 600.

Recall from FIG. 5 that a type II table starts with a T-box, which in turn starts with a key addition. This can be exploited to efficiently create key translation units of the type described in FIG. 10a or 10b. By adding an offset to the first input, the offset will combine with the key addition in the T-box. By choosing the offset to be the difference between the particular key for which the type II table is adapted and the further cryptographic key which is desired, a type II block can be used for any key. The type II block shown in FIG. 5 also has an input encoding. The offset may be encoded with the inverse of the encoding. The offset may also be encoded with a different encoding and the key translation unit may be configured to remove or recoded the different encoding.

The last key-dependent table in the AES implementation shown is a type Ib table. This table depends on two key bytes. A first key addition is done before the S-box, a second is done after the S-box. The first key can be updated by introducing a key translation unit before the type Ib table, for example, as in FIG. 10a or 10b. The second key can be updated by introducing a key translation unit after the type Ib block, for example, as in FIG. 10c.

Combinations of the described techniques are also possible. For example, system 600 may be configured for some key value by replacing a type II table, etc. It is not necessary that system 600 supports all possible AES keys. For example, only part of the round keys can be made updateable. This has the advantage that the cryptographic operations can be customized somewhat, yet reduces the length of the key substitute further.

Note that operations may be done, at least partially, in parallel, in so far as data dependency allows.

Detailed Description of the Improved White-Box Implementation

We continue with a more detailed description of an embodiment of a white-box implementation. We describe an efficient approach for replacing the cryptographic key implemented by a white-box implementation. For every possible key K of the implemented cipher we may specify a small certificate, comprising the key substitute, such that, based on this certificate, a device can derive a white-box implementation that implements key K for that cipher. The certificate is small with respect to the size of the white-box implementation, and can be made to be only a fraction of a kilobyte.

Figure 11:
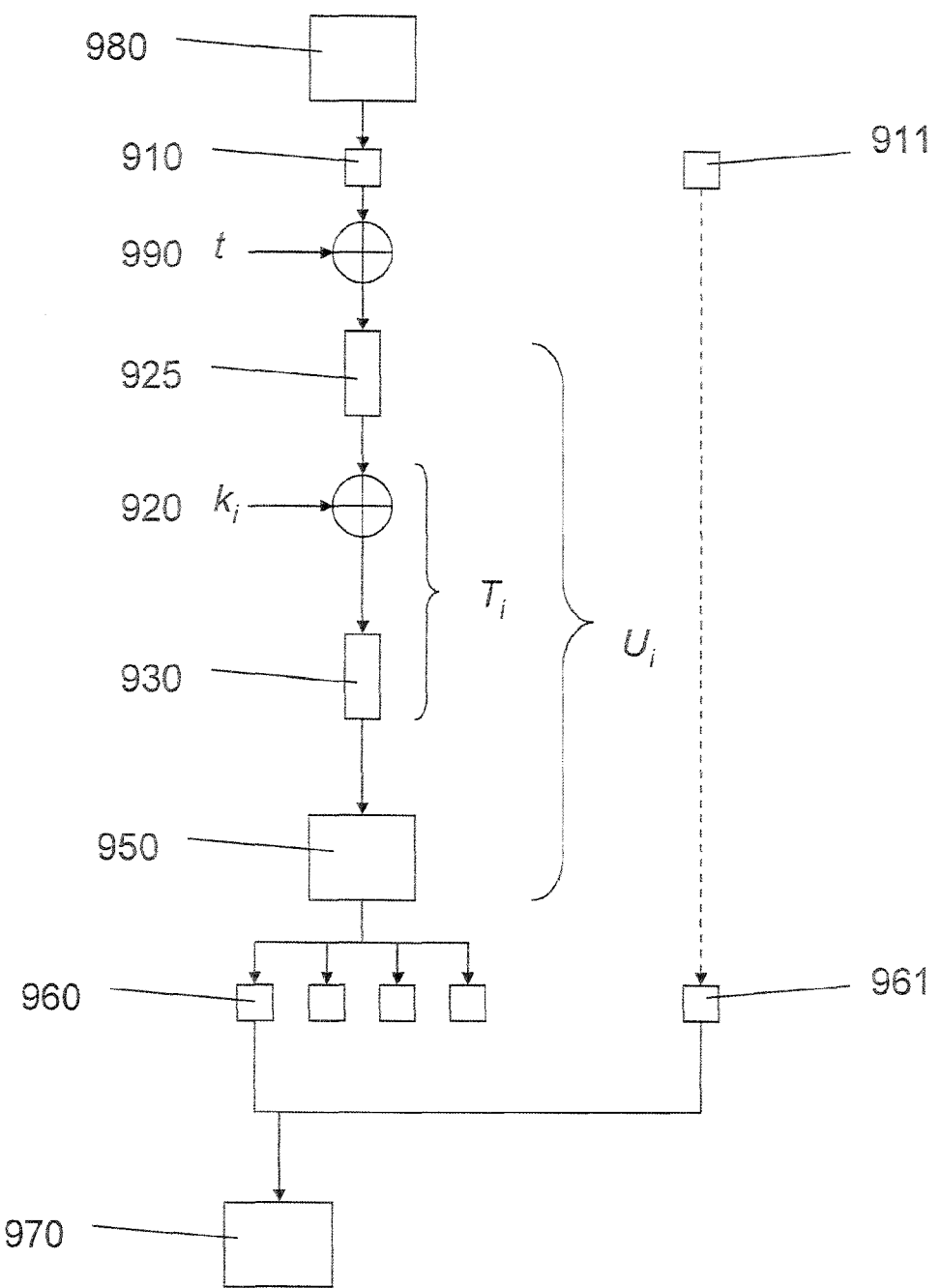
FIG. 11 is a diagram illustrating a round of white-box AES.

We do not discuss this complete white-box implementation here, but only the part that is most relevant for explaining the invention. We refer to FIG. 11. The approach to reconfiguring the key in white-box implementation may parameterize a white-box implementation with an encoding of the round keys. That is, the input of the white-box implementation can be represented as pair (x, y), where x represents the data to be encrypted/decrypted and y represents the key with which the data need to be encrypted/decrypted. Both x and y are used as input to lookup tables in the white-box implementation. Hence, y does not need to contain a specification of the content of the lookup tables.

After optional preceding transformations, such as initial transformations or the previous rounds, a round of AES starts. The beginning of an AES-round is as follows. The input to a round r is split into 16 bytes, the first two of which are indicated with 910 and 911. Byte 910 is the result of block 980 in the preceding round or in initial transformations. Each byte i is XORed with a byte $k_i^{(r)}$ of the 16-byte round key $k^{(r)}$. The first such addition is indicated with 920. The result of this XOR is used as input to an S-box. The S-Box for byte 910 is indicated with 930. In the construction of a white-box implementation, these two operations are merged into a single so-called T-box operation. This means that for each input byte i to the round we define an 8-to-8-bit bijective mapping $T_{i,k_i}^{(r-2)(r)}$ by $$T_{i,k_i}^{(r-2)(r)}(x) = S(x \oplus k_i^{(r-1)}).$$

In the construction of a white-box implementation, this T-box is implemented by a lookup table. The lookup table not only implements the T-box operation, but a function $U_{i,k_i}^{(r-2)(r)}(x) = \alpha_{i,2}^{(r)} \circ T_{i,k_i}^{(r)}(r-2) \circ (\alpha_{i,1}^{(4)})^{-1}$, where $\alpha_{i,1}^{(r)}$ is a bijective 8 to 8-bit mapping and $\alpha_{i,2}^{(r)}$ is an 8 to 32 bit mapping that is not necessarily bijective. The functions $\alpha_{i,1}^{(r)}$ $\alpha_{i,2}^{(r)}$ may differ for different T-boxes. Function $\alpha_1^{-1}$ is indicated with 925, and may represent, e.g., an input encoding. The lookup tables that implement a T-box are the only lookup tables in the implementation that depend on the AES key. The operations that follow the T-box and which together with T form operation U are indicated for byte 910 with 950. Basic block 950 implements at least the MixColumn operation.

Let $I_K$ be a white-box AES implementation according to Chow et al. for AES key K. The construction of this white-box AES implementation can be divided into two parts. In the first part, a white-box implementation is constructed that only uses linear encodings to obfuscate the implementation. The embodiment uses only such obfuscation. However it is noted that in a second part non-linear encodings may also be added. Further obfuscation, for example, using non-linear encodings is preferred, but to simplify the exposition these encodings are not included here. Hence, in the discussion, we can assume that no non-linear encodings are applied. As a consequence, we have that the functions $\alpha_{i,1}^{(r)}$ and $\alpha_{i,2}^{(r)}$ in $U_{i,k_i}^{(r-2)(r)}(x) = \alpha_{i,2}^{(r)} \circ T_{i,k_{ii}}^{(r-2)(r)} \circ (\alpha_{i,1}^{(r)})^{-1}$ are both linear.

Suppose that we want the white-box implementation to implement AES with key $\hat{K}$ instead of AES key K. Then this can be realized as follows. Let the $r^{th}$ round key for K and $\hat{K}$ be given by $k^{(r)}$ and $\hat{k}^{(r)}$, respectively, and let for each input i byte of a round r, and $L_{i,1}^{(r)}$ and $L_{i,2}^{(r)}$ be two lookup tables that implement the XOR, e.g., type IV tables. Furthermore, let byte $t = \alpha_{i,1}^{(r)}(k_i^{(r-1)} \oplus \hat{k}_i^{(r-1)})$ be added to the input of the white-box implementation of $U_{i,k_i}^{(r-2)(r)}$. For r=1 the round keys $k^{(r)}$ and $\hat{k}_i^{(r-1)}$ are associated with the initial key addition of AES. The addition of t, which acts as the key substitute for table $U_{i,k_i}^{(r-2)(r)}$ is indicated with numeral 990. Then, we use table $L_{i,1}^{(r)}$ to XOR the first nibble of $\alpha_{i,1}^{(r)}(x)$ with the first nibble of $\alpha_{i,1}^{(r)}(k_i^{(r-1)} \oplus \hat{k}_i^{(r-1)})$ and table $L_{i,2}^{(r)}$ is used to XOR the second nibble of $\alpha_{i,1}^{(r)}(x)$ with the second nibble of $\alpha_{i,1}^{(r)}(k_i^{(r-1)} \ominus \hat{k}_i^{(r-1)})$. Hence, these lookup tables compute $\alpha_{i,1}^{(r)}(x \ominus k_i^{(r-1)} \ominus \hat{k}_i^{(r-1)})$ from $\alpha_{i,1}^{(r)}(x)$. If we precede each lookup table $U_{i,k_i}^{(r-2)(r)}(x) = \alpha_{i,2}^{(r)} \circ T_{i,k_i}^{(r-2)(r)} \circ (\alpha_{i,1}^{(r)})^{-1}$ in $I_K$ by lookup tables $L_{i,1}^{(r)}$ and $L_{i,2}^{(r)}$, then it is verified that AES key $\hat{K}$ is implemented instead of AES key K. If we consider the input notation (x, y) used above, then y is given by all the bytes $\alpha_{i,1}^{(r)}(k_i^{(r-1)} \oplus \hat{k}_i^{(r-1)})$.

Figure 12:
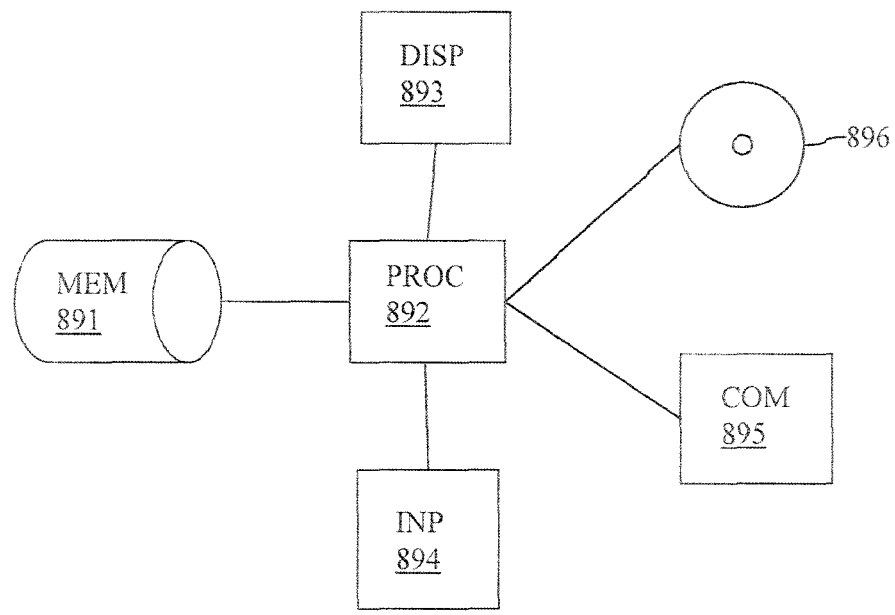
FIG. 12 is a diagram illustrating an embodiment.

FIG. 12 illustrates an embodiment of the invention. The Figure shows a communication port 895 such as a connection to the Internet for connecting with a provider of digital content. The content can also be obtained from medium 896 such as a DVD or CD. Digital content on the PC is typically rendered using media players being executed by processor 892 using memory 891. Such players can execute, for a specific content format, a respective plug-in for performing the format-specific decoding corresponding to content obtained via communication port 895 and/or medium 896. Those content formats may include AVI, DV, Motion JPEG, MPEG-1, MPEG-2, MPEG-4, WMV, Audio CD, MP3, WMA, WAV, AIFF/AIFC, AU, etc. For digital rights management purposes, a secure plug-in may be used that not only decodes the content but also decrypts the content. This plug-in comprises processor instructions and parameters stored in memory 891. Processor instructions may cause the process to perform a method according to the invention. The parameters comprise look-up tables and/or look-up tables as set forth herein. A user input 894 may be provided to obtain commands from a user to indicate content to be rendered, and display 893 and/or speakers are provided for rendering the decoded and/or decrypted content.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example, a CD ROM or a semiconductor ROM, or a magnetic recording medium, for example, a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A white-box cryptographic system for performing a keyed cryptographic operation mapping an input-message to an output-message, the system comprising:
   a network of a plurality of look-up tables arranged for collectively performing the cryptographic operation, the network being adapted for a particular cryptographic key,
   wherein,
   the system is configured to:
   receive a key substitute which represents to the network a further cryptographic key, and
   parse the key substitute into a plurality of second key substitutes,
   the system comprises at least one key translation unit configured for receiving a first input depending on an intermediate cryptographic result in the network and a second input depending on one of the second key substitutes,
   the system is arranged for mapping the input-message to the output-message via the network and the key translation unit to arrange the effect of the network on the cryptographic operation to being adapted for the further cryptographic key.

2. A white-box cryptographic system as in claim 1, wherein at least one specific look-up table of the plurality of look-up tables is adapted for the particular cryptographic key, the system is arranged for mapping the input-message to the output-message via at least the specific look-up table and the key translation unit to arrange the effect of the specific look-up table on the cryptographic operation to being adapted for the further cryptographic key.

3. A white-box cryptographic system as in claim 2, wherein the first input depends on the input message by means of one or more of the plurality of look-up tables and wherein the system is arranged for the specific look-up table to receive as an input depending on an output of the key translation unit.

4. A white-box cryptographic system as in claim 3, wherein the key translation unit is configured with an output-encoding, and wherein the specific look-up table is configured with an input encoding corresponding to the output encoding.

5. A white-box cryptographic system as in claim 2, wherein the system is configured for the first input to depend on an output data of the specific look-up table.

6. A white-box cryptographic system as in claim 5, wherein the specific look-up table is configured with an output-encoding, and wherein the key translation unit is configured with an input encoding corresponding to the output encoding of the specific look-up table.

7. A white-box cryptographic system as in claim 1, wherein the key substitute comprises a difference between the further cryptographic key and the particular cryptographic key.

8. A cryptographic system as in claim 7, wherein the key translation unit is configured for adding the second input to the first input.

9. A cryptographic system as in claim 8, wherein the specific look-up table comprises a cryptographic key addition operation of a sub-key depending on the particular key.

10. A cryptographic system as in claim 9 wherein the cryptographic sub-key addition operation and the addition in the key translation unit of the second input to the first input are arranged to compose into a cryptographic key addition operation of a further sub-key depending on the further cryptographic key.

11. A cryptographic system as in claim 1, wherein the key translation unit is arranged to receive the second input encoded with a key substitute encoding, and wherein the system is configured to receive a key substitute at least part of which is encoded with the second input encoding.

12. A cryptographic method for performing a keyed cryptographic operation mapping an input-message to an output-message, the method comprising
performing the cryptographic operation using a network of plurality of look-up tables arranged for the cryptographic operation, the network being adapted for a particular cryptographic key, wherein the method comprises
receiving a key substitute which represents to the network a further cryptographic key,
parsing the key substitute into a plurality of second key substitute; and
providing a key translation unit with a first input depending on an intermediate cryptographic result of the network and a second input depending on one of the second key substitutes,
wherein
performing the cryptographic operation using the network comprises mapping the input-message to the output-message via the network and the key translation unit to arrange the effect of the network on the cryptographic operation to being adapted for the further cryptographic key.

13. A computer program comprising computer program code means adapted to perform all the steps of the cryptographic method of claim 12 when the computer program is run on a computer.

14. A computer program as claimed in claim 13 embodied on a computer readable medium.

15. A cryptographic system as in claim 8 wherein the cryptographic sub-key addition operation and the addition in the key translation unit of the second input to the first input are arranged to compose into a cryptographic key addition operation of a further sub-key depending on the further cryptographic key.

16. A cryptographic system as in claim 2, wherein the specific look-up table comprises a cryptographic key addition operation of a sub-key depending on the particular key.

17. The system according to claim 1, wherein the system is configured for:
selecting one of the second key substitutes to provide the one of the second key substitutes to the key translation unit.

18. The system according to claim 1, wherein the system is configured for:
selecting one of the second key substitutes for a first look-up table of the plurality of look-up tables and selecting the other second key substitute for a second look-up table of the plurality of look-up tables.

19. The method according to claim 12, comprising:
selecting one of the second key substitutes to provide the one of the second key substitutes to the key translation unit.

20. The method according to claim 12, comprising:
selecting one of the second key substitutes for a first look-up table of the plurality of look-up tables, and selecting the other second key substitute for a second look-up table of the plurality of look-up tables.

* * * * *